United States Patent Office 3,492,184
Patented Jan. 27, 1970

3,492,184
TIRE BODY CENTERING CHUCK
Wilhelm Brey, Cuyahoga Falls, and Arthur M. Lancaster, Akron, Ohio, assignors to The Firestone Tire & Rubber Company, Akron, Ohio, a corporation of Ohio
Filed Feb. 23, 1966, Ser. No. 583,586
Int. Cl. B29h 17/16
U.S. Cl. 156—414                                    7 Claims

ABSTRACT OF THE DISCLOSURE

A tire building chuck comprising an expansible drum mounted on a rotatable support shaft and expansible centering ring assemblies disposed on the axial ends of the drum and functioning to selectively radially expand and contract said drum.

---

This invention relates to the building of vehicle tires, and more particularly to a method and apparatus for symmetrically aligning a partially constructed tire on a chuck for subsequent operations.

As is known to those skilled in the art, it has recently been found advantageous to construct certain tires in stages, due to advanced modes of operation, such as automation. Improvements have been made, for example, in the application of tread rubber to the tire body, one such example being the application of tread rubber by winding a continuous tape or ribbon around the tire body directly from an extruder, calendar, or other supply. (The term "tire body" is being used to describe basically the laminated fabric plies in cylindrical form with bead wire bundles affixed to the edges thereof.) In such case, it is often not feasible to perform the initial tire-body building operation and the tread application at the same station. This generally necessitates removing the unfinished tire body from the initial tire building drum and placing it on a second drum, or chuck, at the tread application station. It is imperative at this point that the tire body be precisely and symmetrically placed on the chuck, in order for the tread to be applied accurately.

The present invention provides a chuck for such symmetrical alignment of a tire body which comprises a rotatable, segmented, radially expansible and contractible drum section having rotatable, axially movable, segmented, radially expansible and contractible centering ring assemblies at each end thereof. The ring assemblies are located symmetrically with respect to the center line of the drum section at all times and are adapted to shift a tire body placed thereon to a symmetrical position with respect to the ends of the drum.

It is therefore an object of this invention to provide an improved tire building chuck for aligning partially built tire bodies symmetrically for subsequent operations.

This and other objects will become more apparent by reference to the following specification and drawings, in which.

Figure 1:
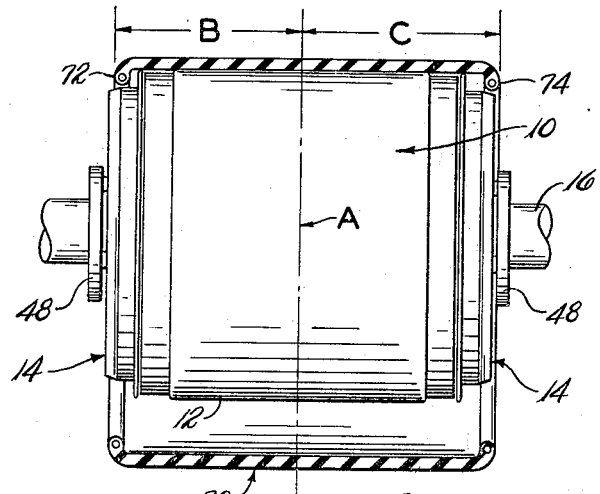
FIGURES 1, 2 and 3 are somewhat diagrammatic views illustrating the successive steps of operation in accordance with the invention.

Referring now to the drawings, the apparatus of the invention is indicated generally by the numeral 10 and comprises a main drum assembly 12 and centering ring assemblies 14, 14 mounted on a rotatable support shaft 16 extending from a housing 18 containing rotatable drive means (not shown) for the entire assembly.

Drum 12 comprises a plurality of arcuate segments 20 adapted to be expanded radially, in part by portions of assemblies 14, 14, and in part by inflatable annular members 22 positioned between drum-hub portion 24 and the segments 20. Contraction of the segments is facilitated by deflation of the annular members 22, and by garter springs 26 seated on lugs 28 on segments 20.

Centering ring assemblies 14, 14 are slidably mounted on shaft 16, at the ends of the drum 12; each assembly 14 comprises a plurality of arcuate segments 30 adapted to be expanded radially by first cylinders 32 located between the ring-hub portions 34 and the segments 30. Contraction of the segments 30 is facilitated by retraction of the cylinder piston rods, and by garter springs 36, 36 seated on flange portions 38 of the segments 30.

Axial motion is imparted to the assemblies 14, 14 by second cylinders 40 in drum-hub portion 24. Cylinders 40 have piston rods 42 which are connected to ring-hub portions 34 at 44 and have reduced portions 46 extending into end plates 48. Resilient means, such as springs 50 are provided on the reduced portions 46 between end plates 48 and ring-hub portions 34. Assemblies 14, 14 are secured for axial motion with respect to shaft 16 as follows. Rods 52 are secured in drum-hub portion 24 and carry threaded shoulder bushings 54 which extend through bearings 56 in bores 58 in ring-hub portions 34. Rods 52 extend through end plates 48, which are secured in position against bushings 54 by lock nuts 60.

Operative axial movement of the assemblies 14, 14 against springs 50 is provided by motion of the piston rods 42 in cylinders 40, and is limited by the shoulders on bushings 54 traveling within the bore 58.

Operation of the apparatus will now be described with reference to FIGURES 1, 2 and 3 of the drawings. As seen in FIGURE 1, a tire body 70 is hanging telescoped over the apparatus 10, the drum 12 and the centering rings 14, 14 being in their radially collapsed, and radially collapsed and axially retracted positions, respectively. The tire body 70 is shown as being off-center, or unsymmetrical, with respect to the radial centerline A of the apparatus 10, the axial distance B from the centerline A to tire bead 72 being shown less than the axial distance C from center-line A to tire bead 74.

Figure 2:
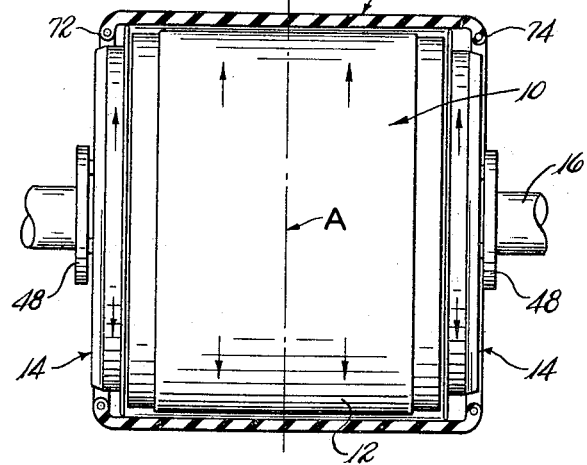
Figure 3:
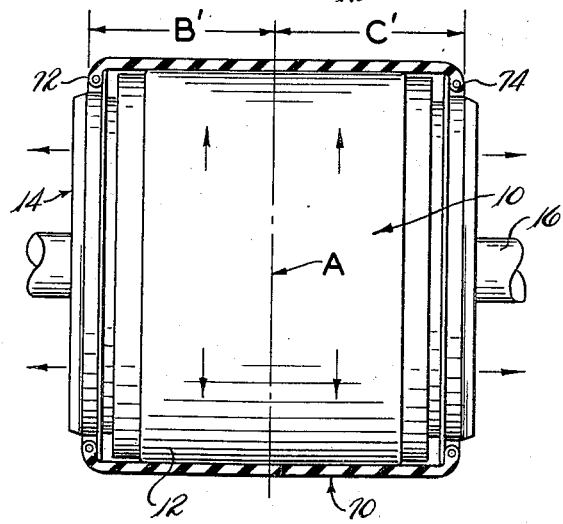

In FIGURE 2, centering rings 14, 14 have been expanded radially by cylinders 32, to bring the shoulders of the segments 30 into light frictional contact with the inner periphery of the tire near the bead areas. This radial motion of rings 14, 14 also causes engagement of ring-portion 76 with the radial inner surface 78 of the segments 20, to expand the drum-segments 20 partially radially. This assures concentricity of the rings 14, 14, and the tire with the drum assembly 12.

As the rings 14, 14 are moved symmetrically, axially outwardly by means of piston rods 42 in cylinders 40, the shoulders of ring-segments 30 slide axially outwardly along the inner tire periphery, engage the beads 72 and 74, and move the tire axially to an aligned position where distances B' and C' are now equal; thus, centerline of the tire body 70 is in alignment with the centerline A of the drum 12.

The drum 12 is now further expanded by inflatable members 22 to urge the outer periphery of the segments 20 against the inner periphery of the tire body 70, thereby providing the necessary support from the tire body during subsequent operations.

Figure 4:
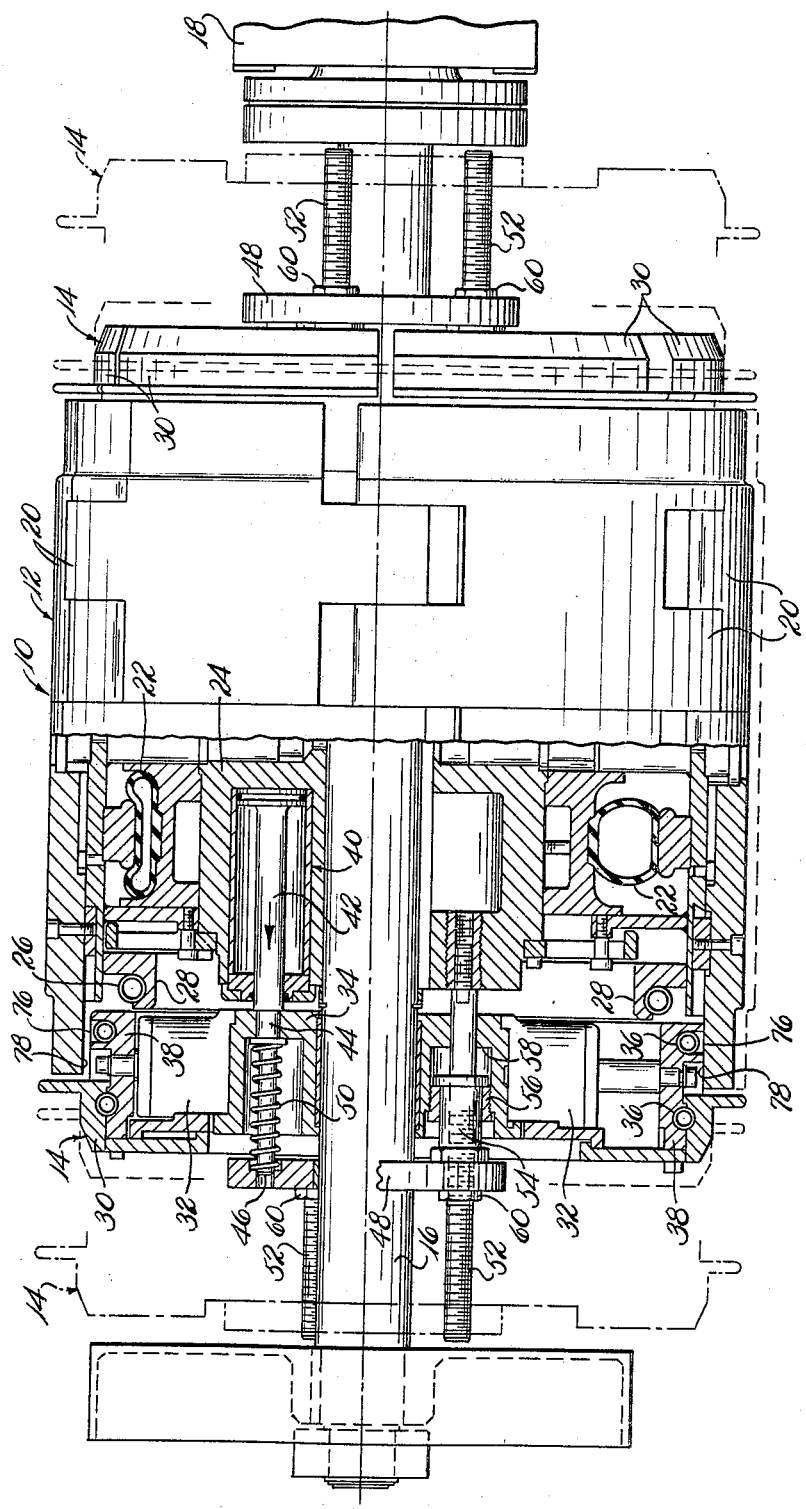
FIGURE 4 is an enlarged elevational view of the apparatus of the invention, partially broken away and in section, the portion above the axial center line showing collapsed position, the portion below the axial center line showing expanded position, and the centering ring assemblies shown in their axially outermost adjusted positions in dot-dash lines.

As seen in FIGURE 4, the positions of operations are depicted. The drum 12 and the centering rings 14, 14 are shown in full lines in the collapsed retracted positions in the portion above the axial center-line of the apparatus. This position is the condition of FIGURE 1.

The drum 12 and the centering rings 14, 14 are shown in full lines in the partially expanded position, in the portion below the axial center-line of the apparatus. This position corresponds to the condition of FIGURE 2. The position of the drum 12, fully expanded, is shown in dotted lines at the bottom portion of FIGURE 4, and corresponds to the condition of the drum in FIGURE 3; the axial position of the shoulders of the centering ring segments 30 shown in dotted lines corresponds to the condition of FIGURE 3.

The dot-dash outline of centering rings 14, 14 in FIGURE 4 illustrates the adjustability of the centering ring assemblies to accommodate tires of larger sizes. Adjustment is accomplished by loosening the lock nuts 60, rotating threaded bushings 54, sliding the assemblies 14, 14 and piston rods 42 axially outwardly to the desired positions and then tightening the lock nuts 60.

The axial operative movement of the centering ring assemblies 14, 14 need be only enough to engage and disengage the inside edges of the tire beads; for example, approximately one half inch motion has been found sufficient in some cases. Likewise, three sets each of piston-cylinders 42–40 and rod assemblies 52, have been found to provide accurate operation of the device.

From the foregoing it is clear that the invention provides an accurate means for centering a tire body on the chuck to provide an improved product.

While one form of the invention has been shown and described, it will be clear that various modifications will occur to those skilled in the art without departing from the scope of the invention as depicted in the appended claims.

What is claimed is:

1. A chuck for accurately aligning a tire axially, comprising a rotatable support shaft, a segmented drum on said shaft, centering ring assemblies disposed at the axial ends of said drum, first means to expand and contract said drum selectively radially comprising a portion of said centering ring assemblies, second means to expand and contract said centering ring assemblies selectively radially, and third means to move said centering ring assemblies symmetrically axially with respect to said drum.

2. A chuck for accurately aligning a tire axially, comprising a rotatable support shaft, a drum on said shaft, centering ring assemblies disposed at the axial ends of said drum, first means to expand and contract said drum selectively radially comprising axial portions on said centering ring assemblies to engage the radial inner surface of said drum, second means to expand and contract said centering ring assemblies selectively radially, and third means to move said centering ring assemblies symmetrically axially with respect to said drum.

3. A chuck for accurately aligning a tire axially, comprising a rotatable support shaft, a drum on said shaft, centering ring assemblies disposed at the axial ends of said drum, first means comprising a ring-carried portion and a drum-carried portion to expand and contract said drum selectively radially, second means to expand and contract said centering ring assemblies selectively radially, and third means to move said centering ring assemblies symmetrically axially with respect to said drum.

4. A chuck for accurately aligning a tire axially, comprising a rotatable support shaft, a drum on said shaft, centering ring assemblies disposed at the axial ends of said drum, first means to expand and contract said drum selectively radially comprising an axial ring-portion to cause initial drum expansion and an inflatable member to cause secondary drum expansion, second means to expand and contract said centering ring assemblies selectively radially, and third means to move said centering ring assemblies symmetrically axially with respect to said drum.

5. A chuck for accurately aligning a tire axially, comprising a rotatable support shaft, a drum on said shaft, segmented centering ring assemblies disposed on said shaft at the axial ends of said drum, first means to expand and contract said drum selectively radially, fluid cylinders to expand and contract said centering ring assemblies selectively radially, and fluid cylinders to move said centering ring assemblies symmetrically axially with respect to said drum.

6. A chuck for accurately aligning a tire axially, comprising a rotatable support shaft, a drum on said shaft, segmented centering ring assemblies disposed at the axial ends of said drum, first means to expand and contract said drum selectively radially, fluid cylinders to expand and contract said centering ring assemblies selectively radially, fluid cylinders to move said centering ring assemblies symmetrically axially with respect to said drum, and resilient means normally urging said ring assemblies toward the drum ends.

7. A chuck for accurately aligning a tire axially, comprising a rotatable support shaft, a segmented drum on said shaft, expansible centering ring assemblies disposed on said shaft at the axial ends of said drum, said centering ring assemblies comprising axial portions adapted, upon expansion, to engage and radially expand said drum on initial amount, and comprising radial shoulders adapted, upon expansion, to engage the interior of the tire frictionally, fluid cylinders to expand said ring assemblies, and means to move said radial shoulders symmetrically axially into engagement with the tire beads to align them accurately with respect to said drum, and inflatable means to expand said drum a secondary amount.

References Cited

UNITED STATES PATENTS

| | | | |
|---|---|---|---|
| 3,433,695 | 3/1969 | Caretta et al. | 156—416 X |
| 3,434,897 | 3/1969 | Caretta et al. | 156—416 X |
| 2,609,311 | 9/1952 | Engler | 156—417 X |
| 2,896,315 | 7/1959 | Dubberke | 29—273 X |
| 2,910,117 | 10/1959 | Lamerson | 157—1.1 |
| 3,030,261 | 4/1962 | Roesch | 156—96 X |
| 3,097,985 | 7/1963 | Heuze | 156—416 |
| 3,237,199 | 2/1966 | Brey | 156—415 |
| 3,319,327 | 5/1967 | Dombeck | 29—273 |
| 3,268,382 | 8/1966 | Urbon | 156—416 X |

HAROLD ANSHER, Primary Examiner

U.S. Cl. X.R.

156—417; 157—1,17